United States Patent [19]

Nguyen et al.

[11] Patent Number: 5,885,419
[45] Date of Patent: Mar. 23, 1999

[54] METHODS FOR INHIBITING ORGANIC CONTAMINANT DEPOSITION IN PULP AND PAPERMAKING SYSTEMS

[75] Inventors: Duy T. Nguyen; Tien-Feng Ling, both of Jacksonville, Fla.

[73] Assignee: BetzDearborn Inc., Trevose, Pa.

[21] Appl. No.: 987,836

[22] Filed: Dec. 9, 1997

Related U.S. Application Data

[62] Division of Ser. No. 677,181, Jul. 9, 1996, Pat. No. 5,746,888.

[51] Int. Cl.$^6$ ....................................................... D21C 9/08
[52] U.S. Cl. ..................... 162/174; 162/158; 162/DIG. 4
[58] Field of Search ................................. 162/174, 199, 162/189, 101, DIG. 4, 158

[56] References Cited

U.S. PATENT DOCUMENTS

| | | | |
|---|---|---|---|
| 1,740,280 | 12/1929 | Bryant | 162/101 |
| 5,368,694 | 11/1994 | Rohlf et al. | 162/199 |
| 5,368,742 | 11/1994 | Roberts | 210/727 |
| 5,474,655 | 12/1995 | Schulte et al. | 162/175 |

FOREIGN PATENT DOCUMENTS

| | | | |
|---|---|---|---|
| 59-223390 | 12/1984 | Japan . | |
| 600628 | 4/1945 | United Kingdom | 162/174 |

OTHER PUBLICATIONS

Pulp and Paper, James Casey, vol. III, 3rd Ed., pp. 1578–1588.

*Primary Examiner*—Peter Chin
*Assistant Examiner*—Steven B. Leavitt
*Attorney, Agent, or Firm*—Alexander D. Ricci; Philip H. Von Neida

[57] ABSTRACT

Methods for inhibiting the deposition of organic contaminants from pulp in pulp and papermaking systems are disclosed. Albumins, globulins or blends thereof and spray-dried animal blood cells are added to the pulp or sprayed onto deposition prone surfaces of a papermaking system suffering from organic contaminants.

5 Claims, No Drawings

METHODS FOR INHIBITING ORGANIC CONTAMINANT DEPOSITION IN PULP AND PAPERMAKING SYSTEMS

This is a divisional of application Ser. No. 08/677,181 filed Jul. 9, 1996 now U.S. Pat. No. 5,746,888.

FIELD OF THE INVENTION

The present invention relates to methods for inhibiting the deposition of organic contaminants in pulp and papermaking systems.

BACKGROUND OF THE INVENTION

The deposition of organic contaminants in the pulp and papermaking industry can cause both quality and efficiency problems in pulp and papermaking systems. Some components occur naturally in wood and are released during various pulping and papermaking processes. The term "pitch" can be used to refer to deposits composed of organic constituents which may originate from these natural resins, their salts, as well as coating binders, sizing agents, and defoaming chemicals which may be found in the pulp. In addition, pitch frequently contains inorganic components such as calcium carbonate, talc, clays, titanium and related materials.

Stickies is a term that has been increasingly used to describe deposits that occur in the systems using recycled fiber. These deposits often contain the same materials found in "pitch" deposits in addition to adhesives, hot melts, waxes, and inks. All of the aforementioned materials have many common characteristics including: hydrophobicity, defoamability, tackiness, low surface energy, and the potential to cause problems with deposition, quality, and efficiency in the process. Diagram I shows the complex relationship between pitch and stickies discussed here.

DIAGRAM I

|  | Pitch | Stickies |
|---|---|---|
| Natural Resins (fatty and resin acids, fatty esters, insoluble salts, sterols, etc.) | X | X |
| Defoamers (oil, EBS, silicate, silicone oils, ethoxylated compounds, etc.) | X | X |
| Sizing Agents (Rosin size, ASA, AKD, hydrolysis products, insoluble salts, etc.) | X | X |
| Coating Binders (PVAC, SBR) | X | X |
| Waxes |  | X |
| Inks |  | X |
| Hot Melts (EVA, PVAC, etc.) |  | X |
| Contact Adhesives (SBR, vinyl acrylates, polyisoprene, etc.) |  | X |

The deposition of organic contaminants can be detrimental to the efficiency of a pulp or paper mill causing both reduced quality and reduced operating efficiency. Organic contaminants can deposit on process equipment in papermaking systems resulting in operational difficulties in the systems. The deposition of organic contaminants on consistency regulators and other instrument probes can render these components useless. Deposits on screens can reduce throughput and upset operation of the system. This deposition can occur not only on metal surfaces in the system, but also on plastic and synthetic surfaces such as machine wires, felts, foils, Uhle boxes and headbox components.

Historically, the subsets of the organic deposit problems, "pitch" and "stickies" have manifested themselves separately, differently and have been treated distinctly and separately. From a physical standpoint, "pitch" deposits have usually formed from microscopic particles of adhesive material (natural or man-made) in the stock which accumulate on papermaking or pulping equipment. These deposits can readily be found on stock chest walls, paper machine foils, Uhle boxes, paper machine wires, wet press felts, dryer felts, dryer cans, and calendar stacks. The difficulties related to these deposits included direct interference with the efficiency of the contaminated surface, therefore, reduced production, as well as holes, dirt, and other sheet defects that reduce the quality and usefulness of the paper for operations that follow like coating, converting or printing.

From a physical standpoint, "stickies" have usually been particles of visible or nearly visible size in the stock which originate from the recycled fiber. These deposits tend to accumulate on many of the same surfaces that "pitch" can be found on and causes many of the same difficulties that "pitch" can cause. The most severe "stickies" related deposits however tend to be found on paper machine wires, wet felts, dryer felts and dryer cans.

Methods of preventing the build-up of deposits on the pulp and papermill equipment and surfaces are of great importance to the industry. The paper machines could be shut down for cleaning, but ceasing operation for cleaning is undesirable because of the consequential loss of productivity, poor quality while partially contaminated and "dirt" which occurs when deposits break off and become incorporated in the sheet. Preventing deposition is thus greatly preferred where it can be effectively practiced.

In the past stickies deposits and pitch deposits have typically manifested themselves in different systems. This was true because mills usually used only virgin fiber or only recycled fiber. Often very different treatment chemicals and strategies were used to control these separate problems.

Current trends are for increased mandatory use of recycled fiber in all systems. This is resulting in a co-occurrence of stickies and pitch problems in a given mill. It is desirable to find treatment chemicals and strategies which will be highly effective at eliminating both of these problems without having to feed two or more separate chemicals. The materials of this invention have clearly shown their ability to achieve this goal.

SUMMARY OF THE INVENTION

The present invention provides for methods for inhibiting the deposition of organic contaminants, such as pitch and stickies, from pulp in pulp and papermaking systems. The methods comprise adding to the pulp or the surfaces of papermaking machinery an effective deposition inhibiting amount of a blood-related protein.

DESCRIPTION OF THE RELATED ART

"Pulp and Paper", by James Casey, Vol. III, 3rd Ed., pp. 1587–88, suggests gelatin as a remedy for pitch trouble. Ser. No. 08/421,349 teaches that a composition of polyvinyl alcohol and high molecular weight gelatin in synergistic ratios will inhibit the deposition of organic contaminants in pulp and papermaking systems.

DETAILED DESCRIPTION OF THE INVENTION

The present invention relates to methods for inhibiting the deposition of organic contaminants from pulp on the surfaces of papermaking machinery in pulp and papermaking systems comprising adding to the pulp or applying to the surfaces of the papermaking machinery an effective deposition inhibiting amount of a blood-related protein.

For purposes of the present invention, blood-related proteins are defined as proteins selected from the group consisting of albumins, globulins, blends of albumins and globulins and spray-dried animal blood cells.

Organic contaminants include constituents which occur in the pulp (virgin, recycled or combinations thereof) having the potential to deposit and reduce paper machine performance or paper quality. These contaminants include but are not limited to natural resins such as fatty acids, resin acids, their insoluble salts, fatty esters, sterols and other organic constituents such as ethylene bis-stearamide, waxes, sizing agents, adhesives, hot melts, inks, defoamers, and latexes which may deposit in papermaking systems.

Blood is the transport system of the body, carrying nutrients and oxygen to all the cells and removing carbon dioxide and other wastes from them. Blood consists of cells suspended in the liquid plasma. The cells, which constitute 45% of the whole volume of blood, include the red cells (erythrocytes), the white cells (leukocytes) and the platelets (thrombocytes). The plasma is a clear liquid constituting about 55% of the blood by volume. Because of a higher specific gravity, the cell elements can be separated from the plasma by centrifugation (1.09 vs. 1.03). Serum is the plasma without fibrinogen, a clotting protein.

Cells (A) Red cells.

There are about 5,000,000 red blood cells per cubic millimeter of the blood. Their main function is to carry oxygen from the lungs to the cells. They also remove carbon dioxide from the cells and carry to the lungs. Hemoglobin is a protein that gives the color to the red cells and has a molecular weight of about 67,000.

(B) White cells

There are about 6,000 white cells per cubic millimeter of blood. Their function is to destroy harmful microorganisms.

(C) Platelets

There are about 250,000 platelets per cubit millimeter of blood. They are concerned with the coagulation of blood.

Plasma

Serum albumins, serum globulins and fibrinogen are the most important protein components of the plasma. The function of serum albumin is to maintain normal osmotic pressure and therefore the water balance of the body. The serum globulins consist of alpha, beta, and gamma globulins. Gamma globulin contains antibodies and antitoxins the body uses to combat infection. Fibrinogen is concerned with the clotting of blood. In general, albumins are transport and storage proteins. Globulins are contractile proteins and protective proteins in vertebrate blood.

In contrast, gelatins are derived by hydrolysis from collagen, and insoluble fibrous protein that occurs in vertebrates and is the main component of connective tissues, tendons and bones. Gelatin is principally made today from cattle bones, cattle hides and pork skins, and has molecular weights in the range of 2,000 to 400,000.

As demonstrated in Diagram II, there are distinct differences in the composition of proteins such as gelatin, and serum albumin and spray-dried animal blood that can be seen in amino acid content.

DIAGRAM II
Amino acid composition of selected proteins

| Amino Acid | Gelatin | Serum Albumin | Spray-Dried Animal Blood |
|---|---|---|---|
| Alanine | 7 | 0.6 | 7.6 |
| Arginine | 8 | 4.9 | 4.0 |
| Aspartic Acid | 6 | 9.0 | 11.0 |
| Cystine | 0.1 | 3.9 | 0.6 |
| Glutamic Acid | 10 | 15.6 | 8.7 |
| Glycine | 23 | 2.9 | 4.7 |
| Histidine | 0.7 | 3.1 | — |
| Hydroxylysine | 1 | — | — |
| Hydroxyproline | 12 | — | — |
| Isoleucine | 1 | 1.8 | 0.6 |
| Leucine | 3 | 11.3 | 13.4 |
| Lysine | 3 | 11.3 | 9.0 |
| Methionine | 0.8 | 1.2 | 0.8 |
| Phenylalanine | 2 | 6.4 | 7.1 |
| Proline | 15 | 6.0 | — |
| Serine | 3 | 4.3 | 4.4 |
| Threonine | 2 | 5.3 | 3.6 |
| Tyrosine | 0.4 | 3.5 | 2.2 |
| Valine | 2 | 8.8 | 9.2 |
| Tryptophan | — | 0.2 | 1.2 |

The albumins, globulins, or blends of albumins/globulins useful in the present invention include but are not limited to serum globulin, serum albumin, blends of serum globulin/albumin, plasma globulin, plasma albumin, and blends of plasma albumin/globulin. These albumins and globulins have molecular weights in the range of 12,000 to 1,000,000. The albumins and globulins useful in the present invention are readily commercially available. Preferred albumins and globulins include serum albumin and serum globulin. Proteins derived from blood cells (e.g., animal) are also useful in the present invention.

The compositions of the present invention are effective at inhibiting the deposition of organic contaminants in papermaking systems. This may include Kraft, acid sulfite, mechanical pulp and recycled fiber systems. For example, deposition in the brown stock washer, screen room and Decker system in Kraft papermaking processes can be inhibited. The term "papermaking systems" is meant to include all pulp processes. Generally, it is thought that these compositions can be utilized to inhibit deposition on all surfaces of the papermaking system from the pulp mill to the reel of the paper machine, having a pH of about 3 to about 12, and under a variety of system conditions. More specifically, the blood-related proteins effectively decrease the deposition not only on metal surfaces but also on plastic and synthetic surfaces such as machine wires, felts, foils, Uhle boxes, rolls and headbox components.

The blood-related proteins of the present invention may be used with other pulp and papermaking additives which include but are not limited to starches, titanium dioxide, defoamers, wet strength resins and sizing aids, dispersants and emulsifiers.

The blood-related proteins of the present invention can be added to the papermaking system at any stage. They may be added directly to the pulp furnish or indirectly to the furnish through the headbox. The inventive compositions may also be sprayed onto surfaces that are suffering from deposition, such as the wire, press felts, press rolls and other deposition-prone surfaces.

The blood-related proteins of the present invention can be added to the papermaking system neat, as a powder, slurry or in solution; the preferred primary solvent being water but is not limited to such. When added by spraying techniques, the composition is preferably diluted with water to a satisfactory inhibitor concentration. The compositions may be added specifically and only to a furnish identified as contaminated or may be added to blended pulps. The compositions may be added to the stock at any point prior to the manifestation of the deposition problem and at more than one site when more than one deposition site occurs. Combinations of the above additive methods may also be employed by feeding the pulp millistock, feeding to the paper machine furnish, and spraying on the wire and the felt simultaneously.

For purposes of the present invention, the term "an effective deposition inhibiting amount" is defined as that amount which is sufficient to inhibit deposition in pulp and papermaking systems. The effective amount to be added to the papermaking system depends on a number of variables including the pH of the system, hardness of the water, temperature of the water, additional additives, and the organic contaminant type and content of the pulp. Generally, from about 1 part to about 200 parts albumin and/or globulins per million parts of pulp are added to the papermaking system. Preferably, from about 2 parts to about 100 parts of the inventive composition are added per million parts of pulp in the system.

There are several advantages associated with the present invention compared to prior processes. These advantages include an ability to function without being greatly affected by the hardness content of the water in the system; an ability to function while not adversely affecting sizing and fines retention; an ability to function at low dosages; reduced environmental impact; an ability to allow the user to use a greater amount of recycled fiber in the furnish; and improved biodegradability.

Further, the blood-related proteins have proven effective against both the pitch and stickies manifestation of organic deposition problems providing for an effective reduction of these problems in paper mills utilizing a variety of virgin and recycled fiber sources.

The data set forth below were developed to demonstrate the unexpected results occasioned by use of the present invention. The following are included as being illustrations of the present invention and should not be construed as limiting the scope thereof.

EXAMPLES

Standard Tape Detackification Test (STDT)

In order to establish the efficacy of the inventive compositions as deposition control agents on plastic surfaces and specifically for adhesive contaminants of the sort found in recycled pulp, a laboratory test was developed utilizing adhesive-backed tapes as stickie coupons. The stickie coupon can be fabricated from any type of adhesive tape that will not disintegrate in water. For this study, tapes made from a styrenebutadiene rubber and vinylic esters were used. Both of these potential organic contaminants are known to cause stickies problems in secondary fiber utilization. A second coupon was fabricated from polyester film such as MYLAR®, a product marketed by DuPont Chemical Company. This material was chosen because paper machine forming fabrics are frequently made of polyester which is susceptible to considerable deposition problems caused by stickies and/or pitch.

This test involved immersing a 2"×4" adhesive tape and a 2"×4" polyester Mylar coupon into a 600 gram solution being tested. The solution contained in a 600 mL beaker is placed in a water bath with agitation and heated to the desired temperature. After 30 minutes of immersion, the tape and coupon are removed from the solution and pressed to 10,000 lb force for one minute. A tensile test instrument (Instron) is then used to measure the force required to pull the two apart. A reduction in the force required indicates that the "stickie" has been detackified. The % control or detackification is calculated by the following equation:

$$\% \text{ detackifation} = \frac{(\text{Untreated force} - \text{treated force})}{\text{Untreated force}} \times 100$$

The results of this testing are presented in Table I.

TABLE I

Standard Tape Detackification Test

| Treatment | Concentration (ppm) | pH | Temp. (°C.) | % Detackification |
|---|---|---|---|---|
| Serum Albumin | 1 | 6 | 50 | 86.3 |
|  | 2 | 6 | 50 | 95.5 |
|  | 5 | 6 | 50 | 100 |
|  | 0.5 | 3 | 50 | 94.9 |
|  | 1 | 3 | 50 | 100 |
|  | 2 | 3 | 50 | 96 |
|  | 5 | 3 | 50 | 100 |
| High molecular weight gelatin | 1 | 6 | 50 | 69.0 |
|  | 2 | 6 | 50 | 70.0 |
| Alkyl substituted Quaternized protein | 2 | 6 | 50 | 48 |
|  | 10 | 6 | 50 | 72 |
| Milk protein | 2 | 6 | 50 | 6 |
| High Molecular Weight animal protein | 2 | 6 | 50 | 71 |
|  | 10 | 6 | 50 | 88 |
| Albumin/globulin | 0.2 | 6 | 50 | 79.8 |
| Serum protein | 0.5 | 6 | 50 | 93.0 |
|  | 1.0 | 6 | 50 | 97.0 |
|  | 2 | 6 | 50 | 100.0 |
| Polyvinyl alcohol | 1 | 6 | 25 | 51 |
|  | 2 | 6 | 25 | 67 |
|  | 5 | 6 | 25 | 92 |
|  | 0.5 | 6 | 50 | 76.2 |
|  | 1 | 6 | 50 | 93.4 |
|  | 2 | 6 | 50 | 99.4 |

As demonstrated in Table I, serum albumin proved more effective than the high molecular weight gelatin at detackifying stickies. Similarly, a combination of albumin and globulin at low dosage was more effective than the high molecular weight gelatin.

Further testing was performed to determine contact angle measurements using the Wilhelmy Plate Method. The advancing and receding contact angles of water on a polyester surface were measured after it had been coated with various of the inventive compositions. The purpose of this study is to evaluate the potential of the proteins to adsorb and/or desorb at a simulated organic contaminant's surface.

A clean piece of polyester (15 mm×40 mm×0.11 mm) was dipped in a protein solution of a given concentration for 30 seconds. The coated polyester surface was then dried at room temperature for two hours. After drying, the advancing and receding contact angles of water on the coated surface were measured for three cycles using a Dynamic Contact Angle Analyzer (Cahn DCA-312). The DCA-312 could run multiple immersions on the same solid-liquid system. Polyester film was used because its surface energy is close to that of the majority of organic contaminants in papermaking systems, such as resin acids, rubber-based contact adhesives, ethylene vinyl acetate hot melts, fatty acids, etc. Additionally, the polyester surface is smooth and easy to clean and handle.

The results of this testing are presented in Table II.

TABLE II

DCA receding contact angle of water on polyester surface at 25° C.

| Sample | Concentration (ppm) | Receding Contact Angle |
|---|---|---|
| Water | — | 54 |
| Serum Albumin | 5 | 13 |
|  | 10 | 12 |
| High molecular weight gelatin | 5 | 17 |
|  | 10 | 16 |
| Albumin/globulin serum protein | 5 | 17 |
|  | 10 | 16 |
| Meat soluble protein | 5 | 38 |
|  | 10 | 27 |
| Tea-cocyl hydrolyzed collagen | 5 | 52 |
|  | 10 | 48 |
| Tea-cocyl hydrolyzed soy protein | 5 | 48 |
|  | 10 | 45 |
| Hydrolyzed wheat protein | 5 | 49 |
|  | 10 | 48 |
| Hydrolyzed gelatin | 5 | 42 |
|  | 10 | 34 |
| Soybean protein | 5 | 48 |
|  | 10 | 46 |
| Polyvinyl alcohol | 5 | 21 |
|  | 10 | 20 |

These results demonstrate that at comparable higher levels of treatment the albumin and albumin/globulin serum proteins are as effective as the high molecular weight gelatin. However, at these treatment levels for the tested compounds, all the compounds will work and a truer measure of the effectiveness of the inventive compositions is seen at lower dosages.

Contact angle measurement provides information about the hydrophobicity of a simulated stickies surface and the change in hydrophobicity as surface active materials are adsorbed and/or desorbed at the surface. If the contact angle of the treated sample is lower than that of the untreated sample, it indicates that the surface becomes more hydrophilic or less tacky with treatment.

As seen in Table I, serum albumin and a blend of albumin/globulin serum protein proved more effective at reducing tackiness of the surface than the high molecular weight gelatin as well as other proteins.

Further studies were performed using a goniometer to measure the contact angle. The Mylar or tape adhesive surface is clamped on a film stage and placed inside a glass test cell. The test solution is added to the cell by carefully pouring 15 mL of the solution into the cell. The whole test cell is then placed inside the chamber of a goniometer available from Kruss as G1 Model. The Mylar or tape surface was immersed in the solution for 30 minutes to simulate the contact time in STDT. An air bubble was positioned on the underside of the Mylar or tape surface using a microsyringe with an inverted tip. The contact angle of the air bubble was measured at various time intervals at room temperature or 50° C.

The results of this testing of various proteins are presented in Tables III and IV.

TABLE III

Goniometer Contact Angle Measurements at 25° C.

| Treatment | Concentration ppm | Surface | Contact Angle |
|---|---|---|---|
| Water | — | Mylar | 58 |
|  | — | Tape | 91 |
| Low molecular weight gelatin (MW ≈ 1,500) | 5 | Mylar | 48 |
|  | 5 | Tape | 47 |
|  | 2 | Tape | 65 |
| Low molecular weight gelatin (MW ≈ 2,000) | 2.5 | Mylar | 49 |
| Meat soluble protein | 2 | Tape | 46 |
| Animal protein | 2 | Mylar | 46 |
|  | 5 | Mylar | 49 |
|  | 5 | Tape | 39 |
| High molecular weight gelatin (MW ≈ 50,000–100,000) | 2 | Mylar | 43 |
|  | 2.5 | Mylar | 37 |
| Polyvinyl alcohol | 2.5 | Tape | 41 |
|  | 2.5 | Mylar | 45 |
|  | 2.5 | Tape | 65 |
|  | 5 | Mylar | 41 |
|  | 5 | Tape | 54 |
| Globulin/albumin serum protein | 2 | Mylar | 30 |
| Bovine albumin | 2 | Mylar | 12 |
| Porcine albumin | 2 | Mylar | 21 |
| Spray-dried animal blood cells | 2 | Mylar | 17 |
| Nonylphenol ethoxylate[1] | 5 | Mylar | 59 |
|  | 10 | Mylar | 52 |
| Ethyleneoxide-propyleneoxide Copolymer[2] | 5 | Mylar | 60 |
|  | 10 | Mylar | 57 |

TABLE IV

Goniometer Contact Angle Measurements at 50°C.

| Treatment | Concentration ppm | Surface | Contact Angle |
|---|---|---|---|
| Water | — | Mylar | 56 |
| High molecular weight gelatin | 2.5 | Mylar | 34 |
| Nonylphenol ethoxylate[1] | 5 | Mylar | 48 |
| Ethyleneoxide-propyleneoxide copolymer[2] | 5 | Mylar | 50 |
| Polyvinyl alcohol | 2.5 | Mylar | 24 |
|  | 0.5 | Mylar | 50 |
| Albumin/Globulin | 2.5 | Mylar | 29 |
| Serum protein | 0.5 | Mylar | 29 |
|  | 0.25 | Mylar | 33 |

[1]Sulfonic® N-95 available from Rohm & Haas
[2]Pluronic® F-108 available from BASF Wyandotte, Inc.

Table III demonstrates that at 25° C., the bovine albumin, porcine albumin, globulin/albumin serum protein and spray-dried animal blood cells show improvement over other known inhibitors by the significant reduction of the contact angle on both Mylar and adhesive tape surfaces.

As evidenced in Table IV, at 50° C., the albumin/globulin serum protein exhibited much lower contact angle on the Mylar as compared to the gelatins tested, proving to be effective as a detackifier.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the deposition of pitch and stickies from pulp in pulp and papermaking systems suffering from pitch and stickies deposition consisting essentially of adding to said pulp an effective deposition inhibiting amount of a blood-related protein.

2. The method as claimed in claim 1 wherein said blood-related protein is selected from the group consisting of albumin, globulin, blends of albumin and globulin, and spray-dried animal blood cells.

3. The method as claimed in claim 1 wherein said albumin is selected from the group consisting of serum albumin and plasma albumin.

4. The method as claimed in claim 1 wherein said globulin is selected from the group consisting of serum globulin and plasma globulin.

5. The method as claimed in claim 1 wherein said albumin is added to said pulp in an amount ranging from about 1 parts to about 200 parts per million parts of pulp.

* * * * *